United States Patent
Suchak et al.

(10) Patent No.: US 7,766,995 B2
(45) Date of Patent: Aug. 3, 2010

(54) OZONE PRODUCTION PROCESSES AND ITS USE IN INDUSTRIAL PROCESSES

(75) Inventors: Naresh J. Suchak, Glen Rock, NJ (US); Ravi Jain, Bridgewater, NJ (US); Kelly Visconti, Roselle, NJ (US); Steven Finley, Wayne, NJ (US)

(73) Assignee: Linde LLC, Murray Hill, NJ (US)

( * ) Notice: Subject to any disclaimer, the term of this patent is extended or adjusted under 35 U.S.C. 154(b) by 353 days.

(21) Appl. No.: 11/784,855

(22) Filed: Apr. 10, 2007

(65) Prior Publication Data

US 2008/0017590 A1 Jan. 24, 2008

Related U.S. Application Data

(60) Provisional application No. 60/796,373, filed on May 1, 2006.

(51) Int. Cl.
*B01D 53/22* (2006.01)
*B01D 53/48* (2006.01)
(52) U.S. Cl. .................... 95/54; 423/219; 423/243.02
(58) Field of Classification Search .............. 95/43, 95/54, 90, 138, 232–235; 423/219, 235, 423/240 R, 243.02; 110/345; 422/186.07–186.2
See application file for complete search history.

(56) References Cited

U.S. PATENT DOCUMENTS

| | | | | | |
|---|---|---|---|---|---|
| 2,872,397 | A | * | 2/1959 | Kiffer | 204/176 |
| 3,963,625 | A | * | 6/1976 | Lowther | 422/186.11 |
| 4,011,298 | A | * | 3/1977 | Fukui et al. | 423/235 |
| 4,430,306 | A | * | 2/1984 | Namba et al. | 422/292 |
| 5,266,292 | A | * | 11/1993 | Bagg et al. | 423/400 |
| 5,620,887 | A | * | 4/1997 | Crabtree et al. | 435/325 |
| 5,846,298 | A | * | 12/1998 | Weist, Jr. | 95/138 |
| 6,030,598 | A | * | 2/2000 | Topham et al. | 423/581 |
| 6,136,284 | A | * | 10/2000 | Hwang et al. | 423/235 |
| 6,190,436 | B1 | * | 2/2001 | Ji et al. | 95/45 |
| 2004/0028576 | A1 | * | 2/2004 | Jain | 422/186.07 |
| 2005/0084436 | A1 | * | 4/2005 | Suchak et al. | 423/242.1 |

\* cited by examiner

*Primary Examiner*—Frank M Lawrence
(74) *Attorney, Agent, or Firm*—Philip H. Von Neida

(57) ABSTRACT

The present invention provides for an improved process for producing ozone which can be used to remove contaminants from gas streams in industrial processes. The improved process uses a separation device after the ozone generating system to separate the ozone from the oxygen gas and directs the ozone to the industrial process and the oxygen back to the feedstream entering the ozone generating system. The improved process further provides for the use of ozone so generated to removed contaminants from industrial process flue gas streams.

23 Claims, 3 Drawing Sheets

OZONE PRODUCTION PROCESSES AND ITS USE IN INDUSTRIAL PROCESSES

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents.

Another known method of removing NOX from gas streams involves contacting the NOX with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002; 5,316,737; 5,985,223; and 6,197,268, the disclosures of which are incorporated herein by reference.

Additionally, the Environmental Protection Agency has presented information showing mercury levels in the environment are at levels that are likely to lead to adverse health effects. Coal-fired utility boilers are one of the largest sources of harmful anthropogenic mercury emissions but also include the $NO_x$ and $SO_x$ emissions sources.

Oxidative air pollution abatement processes have become increasingly important due to stringent air pollution control regulations. Compared to many processes practiced in the industry, the process based on adding ozone to the flue gas is especially attractive to the industry due to its simplicity and ease in integrating with the existing air pollution equipment. The present state of the art with commercially available ozone generators converts only 10 to 12% of oxygen to ozone, thus requiring the supply of oxygen to be 8 to 10 fold to the ozone demand. The power consumption and capital cost rapidly increases when higher conversions are sought from the generators and so do the cooling water requirements. Therefore, ozone is often cost prohibitive in its widespread application as a pollution treatment reagent.

SUMMARY OF THE INVENTION

The present invention is an improved oxidative process which advantageously integrates an oxygen source, ozone generation and its utilization, and significantly reduces overall cost in removing various pollutants such as $NO_x$, Hg, $SO_x$, Cl/HCl from industrial gas streams. This ozone based oxidative process can also abate Dioxins, Furans, PCBs, VOCs and odorous substances present in flue gas streams.

The process consists of generating ozone at low concentration from commercially available ozone generators using oxygen, but at a significantly higher flow rate. The power employed to produce the required quantity of ozone at lower concentrations (6 wt % or less) can be 40 to 60% lower than the power required at 10 wt %. Furthermore, at lower weight concentrations, an ozone generator produces 60 to 70% more than rated capacity. However, the oxygen required to generate ozone is therefore far greater.

The present invention uses oxygen recycle to produce a larger quantity of ozone at similar or lower concentrations from the commercially available ozone generation equipment. A separation module separates ozone from oxygen and recycles oxygen back to the generator. The separation bed can be adsorbent based or a membrane which allows the preferential transfer of $O_3$ over $O_2$ or vice versa. In the case where the adsorbent beds are employed, the ozone is adsorbed preferentially at higher pressure with the gas stream exiting the bed substantially free from ozone which is recycled back with the oxygen feed to the generator.

The adsorbents used include silica gel, high silica mordenites and dealuminated Y zeolite. These adsorbents do not destroy ozone during adsorption. Once the bed is saturated with ozone it is desorbed at lower pressure using a carrier gas such as compressed dry air (CDA). The ozone-containing gas stream at much lower concentration and pressure is inherently more stable and is far more effectively dispersed in the process flue gas stream. Ozone now diluted in the process flue gas stream reacts with the contaminants to convert them to benign compounds or to their oxidized form which are easily removed in dry, semi-dry or wet scrubbers. The reaction and scrubbing can be preferably carried out in the same vessel.

Unlike other applications of ozone such as disinfection of drinking water or waste water which prefer the ozone-containing stream to be at higher concentration for effectiveness, in the flue gas oxidation process, ozone is diluted first and then reacted with contaminants. In fact, the same amount of ozone produced at lower concentration with a carrier gas such as CDA has been shown to be more effective in removing $NO_x$.

In another embodiment of the present invention there is disclosed a process for generating ozone comprising increasing the flow of oxygen-containing gas to an ozone generating device by recycling oxygen gas from a separation system to the oxygen-containing feed gas stream into said ozone generating device.

Concentrations of ozone are achieved at 6% by weight or less.

The oxygen-containing gas feed stream is selected from the group consisting of oxygen, compressed dry air and air. The separation system separates a mixture of ozone and oxygen-containing gas through a membrane separation system or an adsorbent separation system.

The adsorbent separation system contains an adsorbent selected from the group consisting of silica gel, dealuminated Y-type zeolite and high silica mordenites.

In a further embodiment of the present invention, there is disclosed a process for generating ozone wherein said ozone is used in gas streams containing contaminants comprising feeding an oxygen-containing feed gas stream into an ozone generator; separating the oxygen from the ozone-containing gas stream in a separation system; directing said oxygen from said separation system back to said feed gas stream entering said ozone generator; and directing said ozone to said flue gas streams, process streams, or other streams containing contaminants.

The gas streams containing contaminants are flue gas streams from fossil fuel fired sources, process gas streams from chemical, petroleum and petrochemical, metal, semiconductor and glass operations, and off gas streams.

The oxygen-containing gas feed stream is selected from the group consisting of oxygen, compressed dry air and air. The contaminants are selected from the group consisting of nitrogen oxides, sulfur oxides, mercury, chlorine and hydrochloric acid.

The separation system is selected from the group consisting of a membrane separation system and an adsorbent separation system and the adsorbent is selected from the group consisting of silica gel, dealuminated Y-type zeolite and high silica mordenites.

The ozone entering said gas streams containing contaminants is at a temperature of about 40° to about 350° F. The concentration of ozone is about 6 weight percent or less.

In a further embodiment of the present invention, there is disclosed a process for removing contaminants from the flue gas stream of an industrial process comprising the steps of:
a) feeding an oxygen-containing gas stream to an ozone generator, thereby generating an ozone-containing gas stream;
b) directing the ozone-containing gas stream to a gas separation unit to separate oxygen from the ozone-containing gas stream;
c) directing the separated oxygen to the oxygen-containing gas stream of step a);
d) feeding the flue gas stream from an industrial process to flue gas carrier duct; and
e) feeding the ozone-containing gas stream to the flue gas carrier duct, wherein the ozone will react with the contaminants in the flue gas stream.

Alternatively, there is disclosed a process for removing contaminants from the flue gas stream of an industrial process comprising the steps of:
a) feeding an oxygen-containing gas stream to an ozone generator, thereby generating an ozone-containing gas stream;
b) directing the ozone-containing gas stream to a gas separation unit to separate oxygen from the ozone-containing gas stream;
c) directing the separated oxygen to the oxygen-containing gas stream of step a);
d) feeding the flue gas stream from an industrial process to a flue gas carrier duct;
e) feeding the ozone-containing gas stream to the flue gas carrier duct, wherein the ozone will react with the contaminants in the flue gas stream;
f) introducing a reagent liquid such as caustic soda into the flue gas carrier duct to convert the reaction products of ozone and the contaminants into dilute acids of $HNO_3$, $H_2SO_3$, and $H_2SO_4$;
g) adsorbing the dilute acids into liquid water, thereby converting the dilute acids to salts including nitrates, sulfites and sulfates; and
h) discharging the flue gas stream now substantially free of contaminants from the flue gas carrier duct.

The contaminants are selected from the group consisting of nitrogen oxides, sulfur oxides, acid gases and heavy metals; and the nitrogen oxides are selected from the group consisting of nitric oxide and nitrogen dioxide.

DETAILED DESCRIPTION OF THE INVENTION

Figure 1:
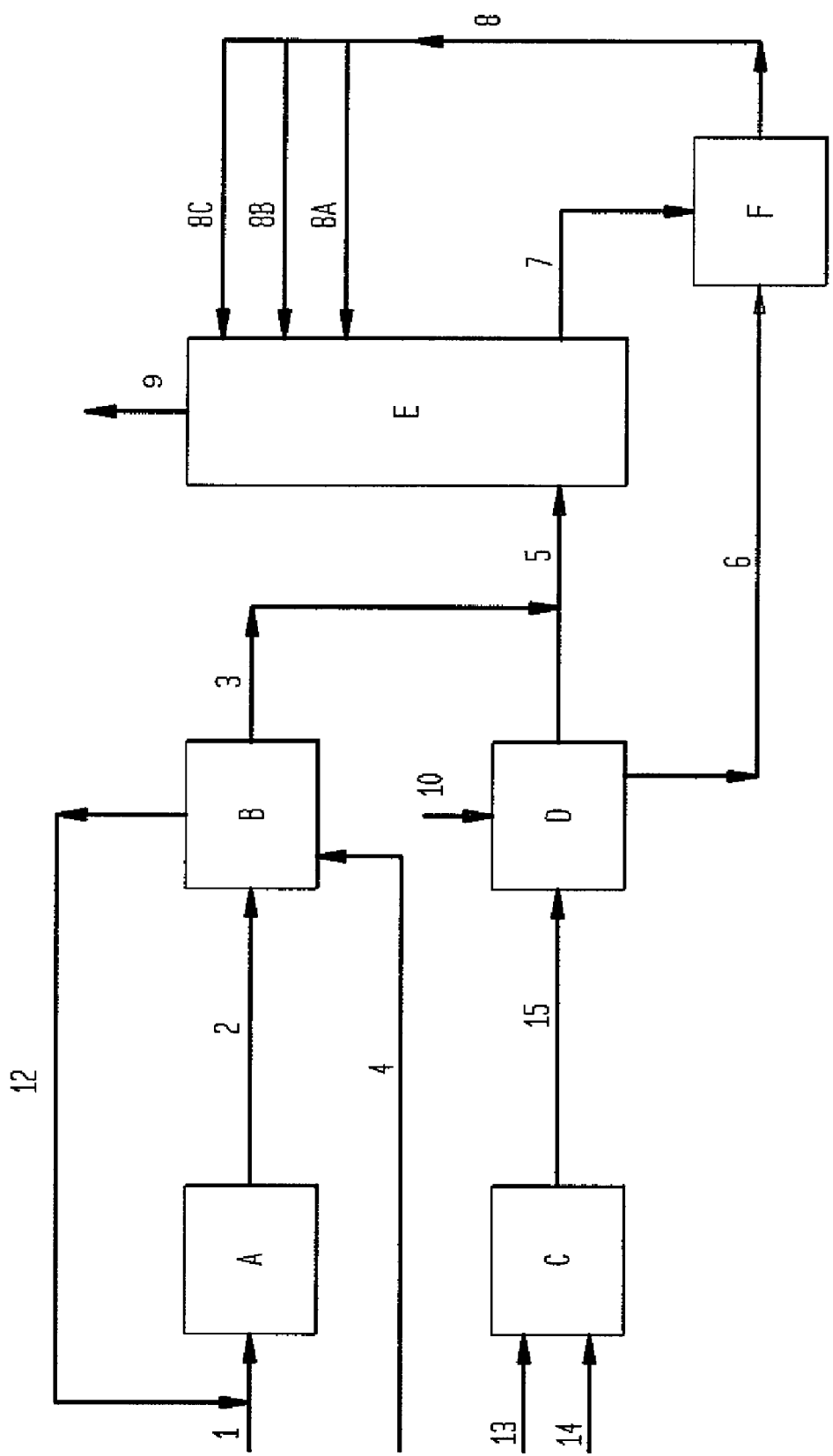
FIG. 1 is a schematic representation of a process for generating ozone and its use in an industrial process for removing contaminants.

FIG. 1 depicts one of the preferred configurations of the improved process. The improved process can treat flue gas streams from fossil fuel fired sources, process gas streams from chemical, petroleum and petrochemical, metal, semiconductor, glass or any manufacturing process that contains undesired contaminants, or off-gas streams from a variety of sources containing undesired contaminants.

Oxygen is fed through line 1 to an ozone generating device A. Ozone generators are typically commercially available and any of these ozone generators will work in the process of the present invention. A gas stream which contains ozone and oxygen along with other trace amounts of gases will exit the ozone generating device A through line 2 to an ozone separation system B. The ozone separation system will be a system that will separate oxygen from ozone or vice versa such that oxygen may be recycled back to the oxygen feed line 1 through line 12.

The separation system is typically a membrane system or an adsorbent bed system. The membrane system is one that will selectively allow the passage of oxygen through the membrane. Typical membranes that can be employed in the methods of the present invention include conventional gas separation membranes made from polymers such as polysulfones, polycarbonates, polyimides, cellulose acetates and their modified forms.

The adsorbent bed system employs a bed which contains an adsorbent selected from the group consisting of silica gel, high silica mordenites and dealuminated Y-type zeolites. When the adsorbent bed is saturated with ozone, it is desorbed by the introduction at lower pressure of a gas stream such as compressed dry air (CDA) which will enter the separation system B through line 4.

The ozone generated by the ozone generator A and separated from oxygen leaves the ozone separation system B through line 3 as a mixture of ozone in the desorption gas. It enters line 5 which enters the scrubber assembly E.

Coal or other fossil fuel will enter the boiler C through line 13 along with air through line 14. The boiler C is used to generate power and will combust the fossil fuel resulting in a flue gas which must be removed from the boiler. The flue gas travels from boiler C through line 15 to a selective adsorber unit D. This selective adsorber unit D provides a conditioning step to the flue gas and may be selected from an electrostatic precipitator or a baghouse for dust, particulate or adsorbent removal. The selective adsorber unit D may also provide selective scrubbing for sulfur oxides such as $SO_2$ or hydrochloric acid which are preferably removed prior to the flue gas stream contacting the oxidative reagent ozone. Water would enter the selective adsorber unit D through line 10. The conditioning step may also be employed to reduce the temperature of the flue gas stream to below 325° F. by the use of indirect heat exchangers, direct quenching or evaporative cooling.

The selective adsorber unit D thus may consist of two or more separate units in combination to condition the flue gas before it contacts the ozone. The flue gas stream which is now conditioned leaves the selective adsorber unit D through line 5 and will contact the ozone from line 3 where reaction between the contaminants still remaining in the flue gas stream and ozone will occur. This reaction will also continue on into the scrubber unit E if so desired.

Where the selective adsorber unit D contains a quenching step, water from the quencher will exit through line 6 to a storage device F which will contain the water but also have means such as pumping means to distribute the water elsewhere in the process.

The flue gas stream that has reacted with the ozone will enter a scrubber unit E through line 5. The scrubber unit in this process is a wet scrubber unit which can be a packed column, spray column, column with sieve trays or bubble trays type scrubber. In other processes of the present invention, the scrubber unit can be a dry or semi-dry type scrubber.

Water will enter the scrubber unit E through lines 8A, 8B, and 8C which is pumped from storage unit F through line 8. These lines connect to nozzles which can provide a variety of water spray patterns to contact the gas stream that has been admitted into the scrubber unit. This scrubbing will remove those contaminants such as particles as well as oxidized contaminants and the now treated flue gas streams and will leave the scrubber unit E through line 7 back to the storage device F. The now scrubbed and clean flue gas stream will exit the scrubber unit E through line 9.

The primary step in the improved process is to condition the gas stream. The conditioning step may consist of using an electrostatic precipitator (ESP) or baghouse for dust, particulate or adsorbent removal. The conditioning step may use selective scrubbing for $SO_2$ or HCl removal or contaminants that must not be oxidized or are preferably removed before exposing to oxidative reagent. The conditioning step may also be used to reduce the flue gas temperature as the preferred range of ozone-based oxidation reaction is less than 325° F. by indirect heat exchangers or by direct quenching or by evaporative cooling. The conditioning step may use one or more unit operations to achieve one or more objectives. Once the gas is preconditioned, ozone containing carrier gas stream (CDA) is dispersed in the bulk of the gas. The preferred temperature range in which the ozone containing stream is introduced in the conditioned gas is preferably between 40 and 350° F.

The ozone containing carrier gas stream is obtained from a subsystem where ozone is produced at lower weight concentration by flowing a larger volume of oxygen through a commercially available ozone generator, then adsorbing ozone on an adsorbent such as silica gel, high silica mordenites and dealuminated Y-type zeolites and desorbing ozone with a carrier gas such as compressed dry air.

Almost all ozone in commercial use is produced by electric discharge, also called corona discharge, where lined glass or ceramic dielectric tubes are fitted inside water-cooled stainless steel tubes with an annular gap (discharge gap) between the two surfaces. Oxygen-containing gas is passed through this gap and when high voltage is applied across the gap part of the oxygen is converted to ozone.

$$O_2+[O]=O_3$$

The conversion of oxygen into ozone $[O_3]$ requires dissociating or breaking a very stable bond in the oxygen molecule and combining this atomic or "singlet" oxygen atom [O] with another oxygen molecule $[O_2]$. When high voltage is applied across a discharge gap, collisions occur between electrons and oxygen molecules. A small fraction of these electrons have sufficient kinetic energy (approximately 6 or 7 eV) to dissociate the oxygen molecule to form ozone, while the remaining electrons release their energy as heat.

$$O_2+6-7 \text{ eV (electrons)} \rightarrow 2 \text{ [O]}$$

Due to corona discharge, the concentration of ozone increases along the length of the tube. The concentration of ozone exiting the tube in single pass ozone generators is likely to be around nominal design concentration. Therefore, for 10 to 12 wt % ozone as nominal concentration, there is one ozone molecule per every 10 to 15 molecules of oxygen. The singlet oxygen is a powerful oxidizing reagent as well as reducing agent. Collision of a singlet oxygen [O] with ozone $[O_3]$ can transform ozone molecule back to an oxygen molecule. The fast moving electrons also collide with ozone destroying part of it. Here is a simplified reaction.

$$O_3+[O] \rightarrow 2 \text{ } O_2$$

Figure 2:
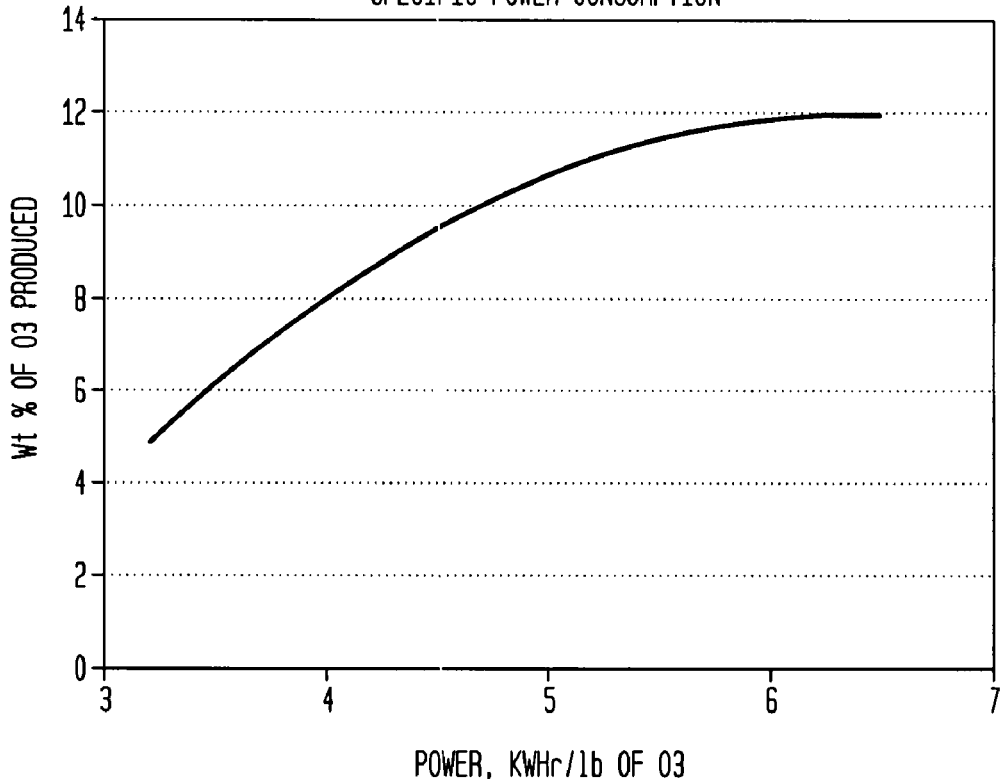
FIG. 2 is a graph representing power consumption versus the amount of ozone produced by ozone generating equipment.

Proposed mechanisms of partial destruction of ozone within the ozone generator are very complex and not very clearly understood. However, the practical experience of operating ozone generation equipment is that specific power consumption increases with increase in concentration of ozone produced. FIG. 2 represents a typical specific power consumption curve of $O_3$ generator available with current state of art knowledge.

So if ozone is produced at 5 or 6 wt % instead of 10-12 wt %, there can be 40% savings in power consumption but this will require twice as much oxygen gas.

About 95% or more of commercially used ozone is in drinking water, bleaching, disinfection and waste water treatment plants. In all these applications ozone is transferred to liquid phase by gas-liquid contacting equipment. The process can lose efficiency if ozone is supplied at half the concentration and twice the flow rate. In addition, the cost of oxygen nullifies the power savings. In contrast, for application of oxidizing contaminants in the flue gas, the ozone containing stream is distributed evenly in the flowing gas stream. Ozone concentration after mixing is a few hundred ppm which then reacts with contaminants. In fact, the efficiency of the process improves since the volume of the ozone containing gas stream doubles, causing better mixing with the flue gas stream.

In the improved process, the ozone containing oxygen stream exiting the ozone generator is fed into the separation device which transfers ozone into the carrier gas stream and recycles most of the oxygen back to the feed stream of the ozone generator. This separation system in one embodiment consists of absorbent beds, switching valves, buffer tanks and process controllers. Ozone adsorbs at higher pressure on the adsorbent bed during the first part of the cycle and when the bed saturates, ozone is desorbed at lower pressure and carried out of the vessel by the carrier gas such as compressed dry air.

After the desorption cycle, the bed is flushed with oxygen to drive away nitrogen on the adsorbent and the ozone adsorption cycle is repeated. The gas stream from this flushing cycle is enriched with oxygen and can be used elsewhere to realize value of the enriched air in combustion in the boiler or kiln or FCC operation in refinery or recycled back to the oxygen generator feed cycle. It is well known practice to supplement pure oxygen feed to ozone generator with a small stream of nitrogen (0.5 to 3 vol %). The small amount of nitrogen is required to be added either periodically or continuously to retain generator efficiency.

Instead of adding nitrogen, some of the gas from the flushing cycle can be recycled to the generator to save on providing a separate feed of $N_2$. Instead of recycle stream, oxygen stream from separation system can be taken to another pair of ozone generator and separation system. Practically, 3 to 4 such systems can be placed in series with gradually smaller size generator, thus making use of same oxygen feed without recycling.

The purge gas is typically compressed dry air produced either as part of the oxygen generation system, vacuum swing adsorption (VSA) or cryogenic oxygen generator, or produced in a standalone system wherein compressed air is dried using a membrane or an adsorptive system. In a cryogenic oxygen generation system waste nitrogen can also be used for purging the adsorbent beds.

In the flue gas oxidation application, the ozone generating area can be far away from the point of use. Therefore, it is important that ozone conveyed is stable until it reaches the point of use. The ozone can be conveyed through pipe over longer distance. Ozone decomposition depends upon the pressure, temperature, concentration and type of gas it is diluted with.

The equation of decomposition is as follows:

$$O_3 + M \leftrightarrow O_2 + [O] + M$$

where M is the balance of gas molecules other than ozone. The published research suggests that ozone in the nitrogen is more stable compared to ozone in oxygen. Also when ozone partial pressure is reduced to half, there are less molecules close enough in the gas phase to collide. Therefore, ozone in compressed dry air at half the partial pressure compared to ozone in $O_2$ at the generator pressure is far more stable. The stability of ozone is particularly important because many industrial processes where flue gas treatment is needed is in the vessels that are unprotected from the weather. Ozone containing gas streams conveyed in the pipe on the pipe racks are exposed to sunlight and summer temperatures which severely affects the stability of ozone.

Distributing headers with nozzles are commonly used for ozone containing carrier gas when introduced in the flue gas. These nozzles generally have a very small orifice since ozone requirement is very small and the pressure at which ozone is generated and transported is high (18 to 25 psig). The high velocity with which ozone comes out of the nozzle often results in exotic material selection for the nozzle. In the improved process, flow of the carrier gas is twice as much as the conventional $O_3$ based oxidation process and pressure is low (around 10 psig) which will require selection of a larger orifice. The velocity at which this carrier gas is throttled through the orifice is less and balance of gas not being oxygen, does not need exotic material for nozzle. In addition, carrier gas with larger flow mixes more easily and uniformly in the flue gas. Larger size orifice also decreases chance of clogging with dirt and moisture in the flue gas phase.

One other consequential advantage is realized in the improved process. The ozone containing headers when placed in the flue gas carrying duct raised the temperature of the header and significant amount of ozone was destroyed in the header itself in the conventional ozone based process. This was due to the multiple phenomena of higher weight concentration, higher pressure, low flow, $O_2$ as balance of gas, and higher temperature. All five of these factors work against ozone stability. The improved process counters all these factors which leads to less destruction of ozone directly or indirectly.

The improved process also uses CFD (computational Fluid Dynamics modeling) to improve the mixing characteristics and the exit age distribution for a given retention time in the vessel.

Using CFD to ensure that mixing has occurred when ozone is introduced in the flue gas is important. If the ozone containing carrier gas is not adequately mixed with the flue gas, ozone molecules do not get a chance to collide with contaminants to oxidize and improperly mixed stream flowing through a duct or a vessel results in a higher amount of unreacted ozone and contaminants, losing efficiency and defeating the purpose of using high performance technology. One of the easiest ways to mix ozone with flue gas is to introduce ozone by way of grid openings with entire cross section of the duct. Another alternative is to introduce ozone radially into the duct.

In the case when flue gas temperature is not lowered in the gas preconditioning step, and ozone is distributed at the temperatures above 200° F. where mixing is not adequate, a significant amount of ozone is destroyed without oxidizing the contaminants. Once ozone oxidizes the contaminants in the predetermined retention time in the duct and or vessel, the flue gas must be scrubbed or adsorbed. $N_2O_5$ is a very temperature sensitive molecule and has low stability. However, with water or alkali or alkaline material it forms quite a stable bond. Using CFD, the improved process ensures that the stream of ozone admixed gas stream is conveyed to the scrubber or adsorber within a preselected retention time with minimum back mixing in the duct or the vessel. This is verified by tracking exit age distribution of the gas exiting the oxidation duct or oxidation volume, also known as reaction zone or oxidation zone.

To improve the exit age distribution, turning vanes and changing the direction of flue gas flow when it is introduced in the vessel are commonly used strategies. For reaction of ozone with contaminants, exit age distribution resembling a plug flow reactor was found to be the best. The improved methods of the present invention utilize exit age distribution rather than residence time or retention time to achieve the appropriate design.

The reactions in the gas phase, for oxidation of NOx with ozone, are summarized as follows:.

$$NO + O_3 \rightarrow NO_2 + O_2$$

$$NO_2 + O_3 \rightarrow NO_3 + O_2$$

$$NO_3 + NO_2 \leftrightarrows N_2O_5$$

$$2\,NO_2 \leftrightarrows N_2O_4$$

$$NO + NO_2 \leftrightarrows N_2O_3$$

$$2\,O_3 \rightarrow 3\,O_2$$

$$SO_2 + O_3 \rightarrow SO_3$$

$$CO + O_3 \rightarrow CO_2$$

Other contaminants such as elemental mercury also oxidize in the oxidizer.

$$Hg^\circ + O_3 \rightarrow Hg^{-2} + O_2$$

The reactor can be the duct upstream of scrubbing vessel, scrubbing vessel itself, or a separate vessel upstream of the scrubbing vessel. It is important that most of the oxidation occurs before it is subjected to scrubbing medium. When the scrubbing vessel bottom section is used as oxidation section, care must be taken to minimize contacting of scrubbing medium.

The oxidation of $SO_2$ to $SO_3$ is found to be negligible in the reactor. It is the higher oxides of nitrogen, in particular, $N_2O_5$ that are most soluble and reactive. Therefore any contact with a scrubbing medium should be avoided until the required amount of oxidation has occurred in the gas volume.

The scrubber can be dry or semi dry type where alkali or alkaline earth metal carbonates, bicarbonates, oxides or hydroxides are used as adsorbent. Wet scrubber can be packed columns, spray columns, columns with sieve trays, or bubble trays. Packing can be random or structured. Spray can be by nozzles that provide a curtain of water such as flat fan or hollow cone or it can be full cone. Scrubbers can have wetted walls for protection against dust and corrosion. Any scrubber wet or dry can be reconfigured to scrub oxidized contaminants. The oxidation volume can be within a single vessel where first spray or venture is used to precondition the gas followed by the volume without spray that provides space to oxidize the contaminants.

A single vessel solution is generally seen to be cost effective. However, it is very difficult to design. The poor design results in intermixing scrubber liquid in the oxidation volume. This can be very easily seen in the examples of systems in published and patented literature where the claims state that oxidation volume is free from the absorbent liquid but in fact it is not. The simplest way to judge that is to examine $NO_x$ removal vs. $O_3/NO_x$ ratio curve or $NO_x$ removal vs. KWHr power/lb of $NO_x$ removed. For inlet $NO_x$ between 50 to 5000 PPMV, if the slope of the curve between 70 to 90% removal is steep, oxidation volume is free from droplets of absorbent. Assuming all inlet $NO_x$ is NO, the second observation is with increase in $O3/NO_x$ ratio, $NO_x$ removal almost approaches to 100% whereas if the slope of the curve is flat between 70 to 90%, it means that ozone and $NO_2$ is being scrubbed in the oxidation reactor and as ozone depletes in the reactor, oxidation of $NO_x$ is not able to proceed further from $NO_2$.

Figure 3:
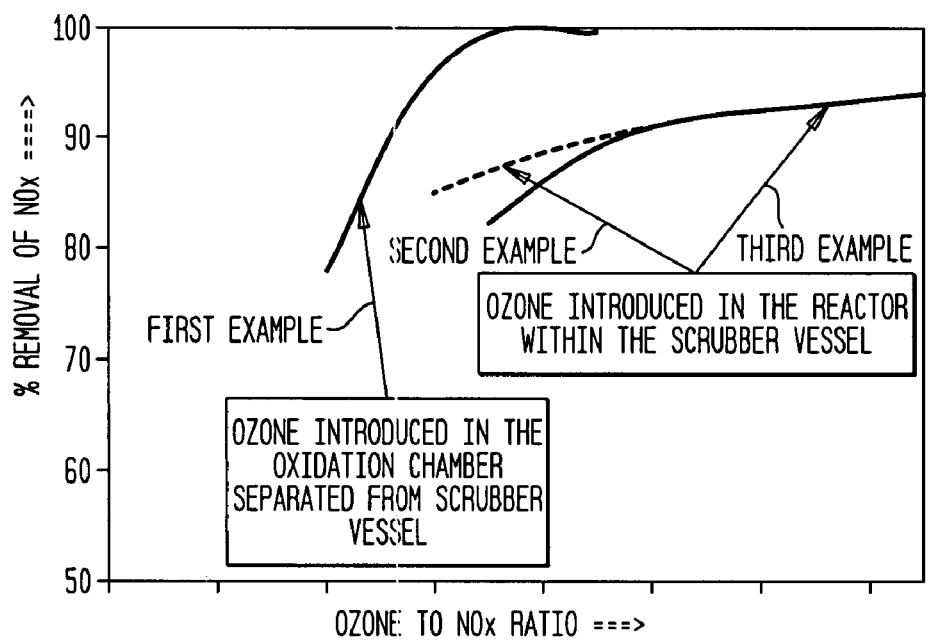
FIG. 3 is a graph showing the percent removal of nitrogen oxides versus the ozone to nitrogen oxides ratios for the inventive processes and two known processes.

FIG. 3 illustrates three examples. The steep continuous line indicates $NO_x$ oxidation occurred in the reactor as intended and almost all $NO_x$ could be converted to higher oxides which could be removed in the scrubber. The second example is a case of vertical absorber where the lower chamber is the oxidation section and absorbent spray is introduced above the oxidation volume in the cylindrical shell. The spray in the absorber part of the vessel is projected from the center towards the wall and the reagent absorbent flows along the wall of this cylindrical shell. It is believed that droplets do not fall in the reaction volume. In contrast, the broken flat line indicates that the oxidation reactions are being interfered with by absorbent droplets from scrubbing section falling in the reaction volume. As a result, some of the ozone is scrubbed out in the reactor and increasing the ozone feed brings marginal improvement in removal efficiency. The third example is the case of horizontal scrubbers with flat fan type spray nozzle. Ozone was introduced downstream of the first quenching spray nozzle. The reaction volume was not adequate between the two sprays. However there are not many absorbent droplets between the first two sprays as the chamber is horizontal. As a result a steeper slope until removal reaches 87 to 90% representing oxidation in the droplet free zone between two sprays. Once the oxidized stream is contacted with absorbent spray, oxidized form of $NO_x$ as well as unreacted ozone is scrubbed off, reducing pace of oxidation by ozone.

The improved process described herein improves efficiency by reducing power requirement in range of 5 to 20% or improves process performance with lesser ozone consumption.

In the wet scrubber, while scrubbing $NO_x$, $SO_x$ and other contaminants, oxygen from the flue gas dissolves in the scrubbing liquor. Although oxidation of sulfite and bisulfite with oxygen is slower than that achieved by ozone, it depletes the quantity of free sulfites and bisulfites. The improved process reduces the quantity of oxygen needed to be added along with ozone thus reducing the depletion of sulfites and bisulfites.

Figure 4:
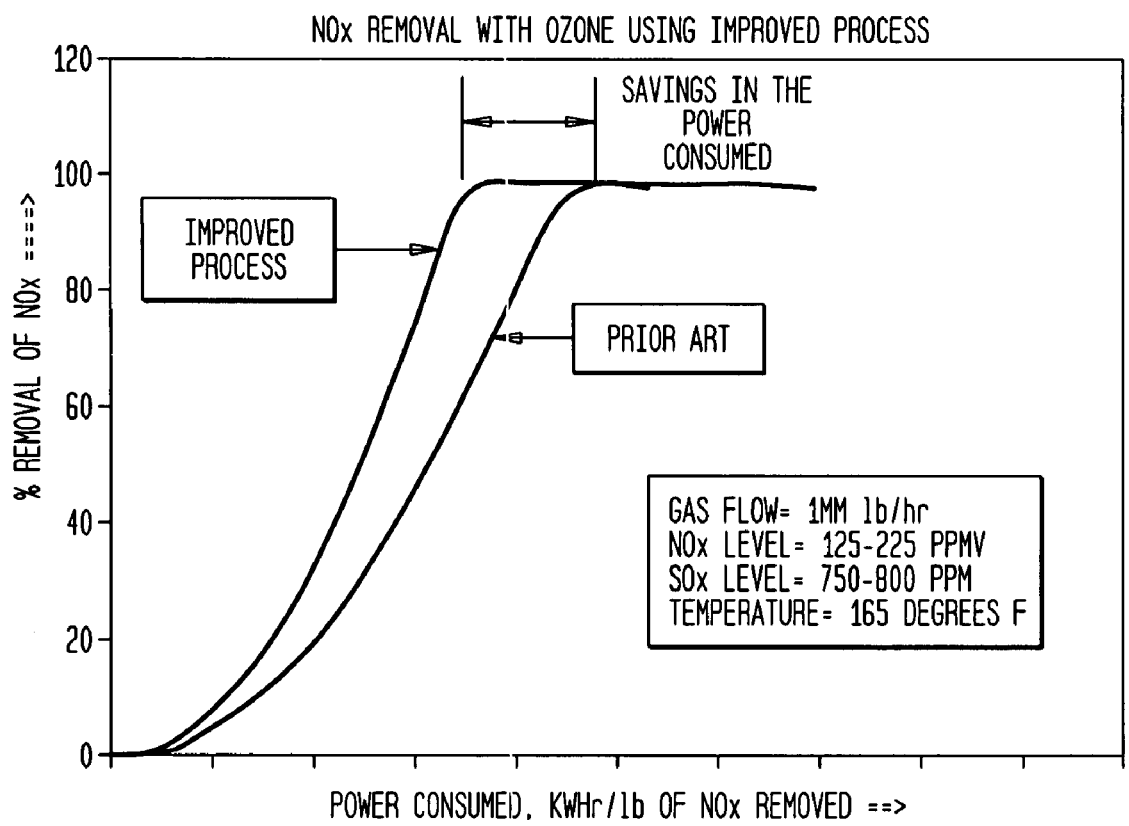
FIG. 4 is a graph showing the percent removal of nitrogen oxides versus the amount of power consumed per pound of nitrogen oxides removed for the inventive process and know process.

For example, in a 1,000,000 lbs/hour flow of flue gas with 750 to 800 PPMV of $SO_x$, and 220 PPMV of $NO_x$ was prescrubbed in an in-duct type of radial prescrubber which was attached to a cylindrical scrubber vessel placed vertically. The prescrubbed flue gas, almost saturated at about 165° F. was mixed with an ozone stream in a carrier gas (compressed dry air) and introduced in the main scrubber vessel. The bottom cylindrical section of the scrubber vessel had a liquid sump. The flue gas stream in the bottom section turned around and traveled upward towards scrubbing section. The flow diverter baffle helped to reduce back mixing and substantial amount of $NO_x$ was oxidized in this bottom section. The oxidized gas was then contacted with scrubbing solution-containing alkali hydroxide, carbonate, bicarbonate, sulfite and bisulfite in the scrubbing section placed in the upper section of the scrubber. The walls were washed with the scrubbing liquor to reduce corrosion and built up of particulates. The treated gas stream exiting the scrubber had less than 10 PPMv of $NO_x$. FIG. 4 summarizes the benefit of CFD analysis in flow design of the oxidizing section and power savings due to improvements described in the improved process.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A process for generating ozone comprising feeding an oxygen-containing gas feed stream selected from the group consisting of air and compressed dry air into an ozone generator thereby producing an ozone-containing gas stream; separating the oxygen in the air or compressed dry air from the ozone-containing gas stream in a membrane separation system; directing the oxygen back to the feed stream entering said ozone generator to combine with said oxygen-containing gas stream selected from the group consisting of air and compressed dry air; and directing an ozone-containing gas stream from said membrane separation system to a process requiring the use of ozone.

2. The process as claimed in claim 1 wherein said process requiring the use of ozone is selected from the group consisting of flue gas streams from fossil fuel fired sources, process gas streams from chemical, petroleum and petrochemical, metal, semiconductor and glass operations, and off gas streams.

3. The process as claimed in claim 1 wherein the temperature of said ozone entering said process requiring the use of ozone is about 40° to about 350° F.

4. A process for generating ozone having a concentration of ozone of about 6 weight percent or less comprising increasing the flow of oxygen-containing gas selected from the group consisting of air and compressed dry air to an ozone generating device by recycling oxygen gas from a membrane separation system to the oxygen-containing feed gas stream selected from the group consisting of air and compressed dry air into said ozone generating device.

5. The process as claimed in claim 4 wherein said separation system separates a mixture of ozone and oxygen-containing gas.

6. A process for generating ozone wherein said ozone is used in gas streams containing contaminants comprising feeding an oxygen-containing feed gas stream selected from the group consisting of air and compressed dry air into an ozone generator to produce an ozone-containing gas stream; separating the oxygen in the air or compressed dry air from the ozone-containing gas stream in a membrane separation system; directing said oxygen from said separation system back to said feed gas stream selected from the group consisting of air and compressed dry air entering said ozone generator; and directing said ozone-containing gas stream from said separation system to said gas streams containing contaminants.

7. The process as claimed in claim 6 wherein said gas streams containing contaminants are selected from the group consisting of flue gas streams from fossil fuel fired sources, process gas streams from chemical, petroleum and petrochemical, metal, semiconductor and glass operations, and off gas streams.

8. The process as claimed in claim 6 wherein said contaminants are selected from the group consisting of nitrogen oxides, sulfur oxides, mercury, chlorine and hydrochloric acid.

9. The process as claimed in claim 6 wherein said ozone entering said gas streams containing contaminants is at a temperature of about 40° to about 350° F.

10. A process for removing contaminants from the flue gas stream of an industrial process comprising the steps of:
  a) feeding an oxygen-containing gas stream selected from the group consisting of air and compressed dry air to an ozone generator, thereby generating an ozone-containing gas stream;
  b) directing said ozone-containing gas stream to a membrane separation unit to separate oxygen from said oxygen-containing gas stream from said ozone-containing gas stream;
  c) directing said separated oxygen back to said ozone generator to combine with said oxygen-containing gas stream selected from the group consisting of air and compressed dry air to the oxygen-containing gas stream of step a);
  d) feeding said flue gas stream from an industrial process to a flue gas carrier duct; and
  e) feeding a seperated ozone-containing gas stream from step b) to said flue gas carrier duct, wherein the ozone will react with the contaminants in said flue gas stream.

11. The process as claimed in claim 10 wherein said industrial process is selected from the group consisting of flue gas streams from fossil fuel fired sources, process gas streams from chemical, petroleum and petrochemical, metal, semiconductor and glass operations, and off gas streams.

12. The process as claimed in claim 10 wherein the temperature of said ozone entering said industrial process requiring the use of ozone is preconditioned by heat exchange, scrubbing or quenching to about 40° to about 350° F.

13. The process as claimed in claim 10 wherein said contaminants are selected from the group consisting of nitrogen oxides, sulfur oxides, acid gases and heavy metals.

14. The process as claimed in claim 13 wherein said nitrogen oxides are selected from the group consisting of nitric oxide and nitrogen dioxide.

15. A process for removing contaminants from the flue gas stream of an industrial process comprising the steps of:
  a) feeding an oxygen-containing gas stream selected from the group consisting of air and compressed dry air to an ozone generator, thereby generating an ozone-containing gas stream;
  b) directing said ozone-containing gas stream to a membrane separation unit to separate oxygen from said oxygen-containing gas stream from said ozone-containing gas stream;
  c) directing said separated oxygen to the oxygen-containing gas stream selected from the group consisting of air and compressed dry air of step a);
  d) feeding said flue gas stream from an industrial process to a flue gas carrier duct;
  e) feeding a separated ozone-containing gas stream from step b) to said flue gas carrier duct, wherein the ozone will react with the contaminants in said flue gas stream;
  f) introducing a reagent liquid into said flue gas carrier duct to convert the reaction products of ozone and said contaminants into dilute acids;
  g) adsorbing said dilute acids into liquid water, thereby converting said dilute acids to salts; and
  h) discharging said flue gas stream now substantially free of contaminants from said flue gas carrier duct.

16. The process as claimed in claim 15 wherein said industrial process is selected from the group consisting of flue gas streams from fossil fuel fired sources, process gas streams from chemical, petroleum and petrochemical, metal, semiconductor and glass operations, and off gas streams.

17. The process as claimed in claim 15 wherein the temperature of said ozone entering said industrial process requiring the use of ozone is about 40° to about 350° F.

18. The process as claimed in claim 15 wherein said contaminants are selected from the group consisting of nitrogen oxides, sulfur oxides, acid gases and heavy metals.

19. The process as claimed in claim 18 wherein said nitrogen oxides are selected from the group consisting of nitric oxide and nitrogen dioxide.

20. The process as claimed in claim 15 wherein said liquid reagent is caustic soda, carbonates, bicarbonates, or hydroxides of calcium, magnesium, potassium or ammonia.

21. The process as claimed in claim 15 wherein said dilute acids are selected from the group consisting of $HNO_3$, $H_2SO_3$, and $H_2SO_4$.

22. The process as claimed in claim 15 wherein said salts are selected from the group consisting of nitrates, sulfites and sulfates.

23. The process as claimed in claim 15 wherein said ozone is introduced uniformly in the entire cross section of the duct by a grid, or is introduced radially.

* * * * *